(12) United States Patent
Curlier et al.

(10) Patent No.: US 9,884,675 B2
(45) Date of Patent: Feb. 6, 2018

(54) SYSTEM FOR CHANGING THE PITCH OF THE BLADES OF A PROPELLER

(71) Applicant: SNECMA, Paris (FR)

(72) Inventors: Augustin Curlier, Melun (FR); Olivier Belmonte, Perthes en Gatinais (FR)

(73) Assignee: SNECMA, Paris (FR)

( * ) Notice: Subject to any disclaimer, the term of this patent is extended or adjusted under 35 U.S.C. 154(b) by 997 days.

(21) Appl. No.: 14/154,411

(22) Filed: Jan. 14, 2014

(65) Prior Publication Data

US 2014/0205457 A1 Jul. 24, 2014

(30) Foreign Application Priority Data

Jan. 18, 2013 (FR) ..................................... 13 50438

(51) Int. Cl.
*B64C 11/38* (2006.01)
*F01D 7/00* (2006.01)
(Continued)

(52) U.S. Cl.
CPC ............ *B64C 11/38* (2013.01); *B64C 11/306* (2013.01); *F01D 7/00* (2013.01); *F02K 3/072* (2013.01);
(Continued)

(58) Field of Classification Search
CPC ......... B64C 11/38; B64C 11/306; F01D 7/00; F02K 3/072; F02C 3/067; F04D 29/362;
(Continued)

(56) References Cited

U.S. PATENT DOCUMENTS 4,179,241 A * 12/1979 Courshon, Jr. ......... B64C 11/34
416/137
4,523,891 A * 6/1985 Schwartz ................ B64C 11/38
416/157 R
(Continued)

FOREIGN PATENT DOCUMENTS

FR     2 957 329 A1    9/2011
GB       412434 A *    6/1934 ............. B64C 11/36
(Continued)

OTHER PUBLICATIONS

French Preliminary Search Report dated Oct. 1, 2013 in French 13 50438, filed on Jan. 18, 2013 (with English Translation of Category of Cited Documents with Written Opinion).

*Primary Examiner* — Sean J Younger
(74) *Attorney, Agent, or Firm* — Oblon, McClelland, Maier & Neustadt, L.L.P.

(57) ABSTRACT

A system includes a linear-displacement fluidic actuator coaxial with the propeller, and a transmission device connecting the actuator to the blades that are to be controlled. The transmission device includes at least two radial arms arranged symmetrically with respect to the actuator and connected, on the inside, to a translationally mobile part of the actuator and, on the outside, to a translationally movable rotary transmission ring which is connected to the pivot pins of the blades by intermediate connecting mechanisms that convert the translational movement of the rotary ring brought about by the actuator into a rotation of the blades of the propeller.

10 Claims, 4 Drawing Sheets

(51) Int. Cl.
*B64C 11/30* (2006.01)
*F02K 3/072* (2006.01)
*F04D 29/36* (2006.01)

(52) U.S. Cl.
CPC ........ *F04D 29/362* (2013.01); *F05D 2220/36* (2013.01); *F05D 2260/50* (2013.01); *F05D 2270/64* (2013.01); *Y02T 50/673* (2013.01)

(58) Field of Classification Search
CPC ............. F05D 2260/50; F05D 2260/53; F05D 2260/64
USPC ...................................................... 416/157 R
See application file for complete search history.

(56) References Cited

U.S. PATENT DOCUMENTS

| | | | | |
|---|---|---|---|---|
| 4,591,313 A | * | 5/1986 | Miyatake | B64C 11/306 416/127 |
| 4,657,484 A | | 4/1987 | Wakeman et al. | |
| 5,154,580 A | * | 10/1992 | Hora | B64C 11/306 416/129 |
| 5,242,265 A | * | 9/1993 | Hora | B64C 11/32 416/129 |
| 8,075,270 B2 | * | 12/2011 | Violette | F01D 7/00 416/148 |
| 2012/0099987 A1 | | 4/2012 | Belmonte et al. | |
| 2013/0011259 A1 | | 1/2013 | Balk et al. | |
| 2013/0017087 A1 | | 1/2013 | Gallet | |
| 2014/0017086 A1 | * | 1/2014 | Charier | B64C 11/308 416/128 |

FOREIGN PATENT DOCUMENTS

| | | | | |
|---|---|---|---|---|
| GB | | 756134 A | * 8/1956 | ............. B64C 11/40 |
| GB | | 2492882 A | 1/2013 | |
| WO | WO 2010/136684 A1 | | 12/2010 | |
| WO | WO 2012/131271 A1 | | 10/2012 | |

\* cited by examiner

SYSTEM FOR CHANGING THE PITCH OF THE BLADES OF A PROPELLER

BACKGROUND OF THE INVENTION AND DESCRIPTION OF THE PRIOR ART

The present invention relates to a system for changing or setting the pitch of the blades of a turbomachine propeller or rotor.

More particularly, although not exclusively, the system is intended to be fitted to turbomachines made up of a pair of coaxial and counter rotating propellers, known in English as "open rotors" or "unducted fans", the pair of propellers being likened to the fan of turbojet engines.

There are two structural solutions that are currently being developed, one with the pair of propellers arranged downstream of the turbomachine, the open rotor being qualified as a "pusher", and the other with the pair of propellers arranged upstream of the turbomachine, the open rotor being qualified as a "puller".

Without going into the advantages and disadvantages of these two solutions, which do not form part of the subject matter of the invention here, the pitch of the propeller blades is made adjustable by a pitch change system so as to allow the turbomachine to operate optimally in the various operational phases encountered during flight and on the ground. Thus, such as system is fitted to each rotor and notably comprises a control actuator that allows action on a transmission device involving link rods and radial arms or shafts which act on the rotary pivot pins or roots of the blades in order to modify the angle at which they are set.

The actuator of the orientation system is controlled by a hydraulic-fluid feed device which, by means of the orientation system thus fed with fluid, allows the pitch of the relevant propeller to be varied for the following operational phases: 1) in flight, for example between +90° to 30°, 2) on the ground and in reverse between +30° and −30°, and 3) returning to the feathered (90°) position in the event of an in-flight malfunction.

The actuator of the system is usually a linear-displacement ram that moves under the action of the oilfeed device, and its mobile part is connected to the transmission device via at least one bearing. Thus, translational movement of the mobile part drives the inner ring of the bearing the rotary outer ring of which, via the rolling elements, transmits the translational movement to the rotary transmission device connected to the rotor of the propeller.

In order to modify the angular position of the roots of the blades mounted in the conventional way in a polygonal ring of the rotor of the propeller, the transmission device comprises transmission link rods arranged around the bearing or bearings and, connected to these link rods, as many radial arms as there are blades, each radial arm acting directly on the blade roots. Hence, each radial arm has to pass through cylindrical casings, notably a wall or walls depending on the engine ventilation requirements, that allow oil to return from the rotary casing enclosure to the lubrication oil discharge system. Problems of sealing between the walls of the casings passed through and all of the radial arms then arise.

In addition, given the design of these systems, the hydraulic actuator may be highly influenced by the non-axisymmetric aerodynamic loadings applied to the propeller (bending moment applied to the system about an axis perpendicular to the longitudinal axis of the turbomachine) which may go so far as to cause the system to jam.

It is an object of the present invention to overcome these disadvantages by providing a novel solution.

SUMMARY OF THE INVENTION

To this end, the system for changing the pitch of the blades of a propeller, comprising a linear-displacement fluid actuator coaxial with the propeller and a transmission device connecting the actuator to the blades that are to be controlled, is notable according to the invention in that the transmission device comprises at least two radial arms arranged symmetrically with respect to the actuator and connected, on the inside, to a translationally mobile part of the actuator and, on the outside, to a translationally movable rotary transmission ring which is connected to the pivot pins of the blades by intermediate connecting mechanisms that convert the translational movement of the rotary ring brought about by the actuator into a rotation of the blades of the propeller.

Thus, by virtue of the invention, the number of radial arms used for controlling, via the rotary common ring and the connecting mechanisms, all of the propeller blades can be reduced as, therefore, can the ensuing problems of sealing the turbomachine casings through which the arms pass. Specifically, there is no longer any need to have the same number of arms as there are blades because the ring is able to distribute and transmit the force of the actuator to the pivot pins of the blades. As the regions in which arms pass through the casings are reduced, so too are the risks of leaks.

In the minimal configuration, just two radial arms which for the purpose of uniformly spreading load are diametrically opposed, may be provided for controlling, via the rotary ring and the mechanisms affording connection to the blade roots, the rotation of these blades (one arm alone being unacceptable because of the imbalance it creates).

Advantageously, the translationally movable rotary ring has a diameter substantially the same as at the diameter of a support ring that supports the pivot pins of the blades, so as to lie at substantially the same radial position as these. The control of the blades is thus relocated to the engine nacelle, at a radius distant from the actuator and on the outside of the casings through which the arms pass, so that there is no longer any need to have one radial arm per blade to be controlled because it is the common ring, thus radially offset, which takes care of blade orientation.

When the linear actuator is fixed with respect to a static casing of the turbomachine, mounted around the mobile part of the actuator are bearings connected to the mobile part of the actuator and housed in a rotary cylindrical support with which the radial arms of the transmission device collaborate. Thus, the movement of the sliding mobile part at the rotary transmission device (arm and ring) is provided by these transfer bearings.

For example, the bearings support comprises axial platforms with racks, pinions secured to the radial arms on the inside of these collaborating with these racks and being able to drive the rotation of said arms as a result of the translational movement of the mobile part of the actuator and of the support.

Similarly, the rotary transmission ring comprises axial platforms with racks, pinions secured to the radial arms on the outside of these collaborating with these racks, said platforms being slidably mounted in guideways that are translationally fixed, so that the pinions of the radial arms, by rotating, drive the translational movement of the platforms and of the rotary ring with respect to the guideways.

To ensure balanced, axisymmetric transmission, the device of the orientation system comprises four radial arms arranged in one and the same radial plane uniformly spaced 90° apart about said linear actuator.

Moreover, each intermediate connecting mechanism of the transmission device may comprise two link rods which are articulated to one another, one of them also being articulated to a fastening support for securing the ring and the other also being articulated to the pivot pin of the corresponding blade of the propeller, the two link rods of each mechanism being substantially aligned parallel to the axis of rotation of the ring and perpendicular to the axis of pivoting of the blade. These link rods of the connecting mechanisms allow the translational movement of the rotary ring to be converted into a rotation of the blades in the manner of a connecting-rod/crank system.

Advantageously, a stiffening means connected with the corresponding link rod is provided on the rotary transmission ring, while the other link rod of the mechanism is articulated to a counterweight secured to the pivot of the corresponding blade.

Indeed it is known that the counterweights are used so that the centrifugal force generated spontaneously returns the blades to the feathered position if there is a malfunctioning of the orientation system as a result, for example, of a defective hydraulic feed to the actuator. These counterweights are therefore used as levers to control the angular setting of the blades by applying a force that is exerted in the direction of the axis of the turbomachine, unlike the solutions of the prior art in which the force delivered by the actuator is transmitted directly, via a radial arm or shaft, along the axis of the blade making it necessary to have one radial shaft per blade. Further, advantageously, to prevent high magnitude aerodynamic forces exerted on the blades from being transmitted by the counterweights to the device (ring and connecting mechanisms), the stiffening means is designed to absorb these forces without transmitting them to the device which is then able to enjoy problem free operation.

According to various nonlimiting embodiments, the stiffening means is a ring of elastic material surrounding the link rod, a radial spring, or an element made of metal positioned between the support and the link rod.

The invention also relates to a turbomachine having at least one propeller for an aircraft, comprising a system for changing the pitch of the blades of said propeller, comprising a linear displacement annular fluidic actuator and a transmission device connecting the actuator to the blades that are to be controlled in order to change the orientation of those blades.

Advantageously, the transmission device is as defined hereinabove.

BRIEF DESCRIPTION OF THE DRAWINGS

The figures of the attached drawing will make it easy to understand how the invention may be embodied. In these figures, identical references denote elements that are similar.

DESCRIPTION OF THE PREFERRED EMBODIMENTS

Figure 1:
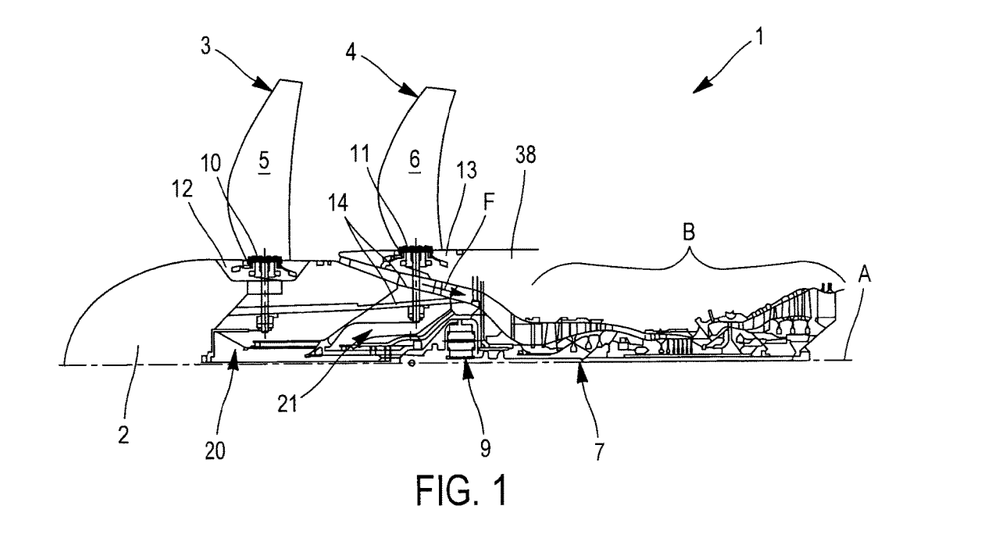
FIG. 1 is a partial and schematic half view in longitudinal section of a turbomachine with a pair of counter rotating propellers situated upstream of the turbomachine and the pitch of each of which propellers is controlled by a suitable change or orientation system.

The turbomachine 1 depicted in FIG. 1 is a turbomachine with an upstream unducted fan, referred to more commonly in English as an "open rotor puller", of longitudinal axis A.

Provided at the front 2 of the turbomachine 1 are two propellers 3, 4 that are coaxial about the axis A and counter rotating, forming the fan and the blades 5, 6 of which can be set at variable pitch angles to suit the various phases of flight, including taxiing along the ground, described hereinabove and encountered by the airplane equipped with these turbomachines.

As already indicated, the entire pulling front part 2 of the turbomachine is therefore able to rotate about the axis A and in order to do so is driven by the gas generating part 7, which is therefore downstream, where the compressors, combustion chamber and turbines indicated under the reference 8 can usually be found. The stream of air entering the part 7 is symbolized by the arrow F.

Figure 2:
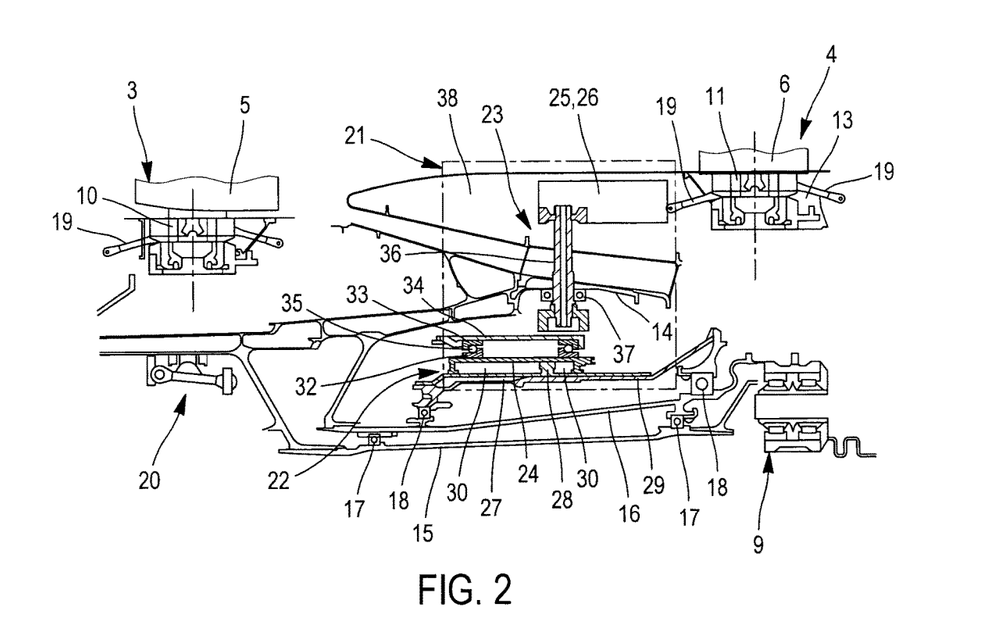
FIG. 2 shows, schematically and in accordance with the invention, the pitch change system for the downstream rear propeller of the pair with which the turbomachine is equipped.

As shown by FIG. 1 and notably by FIG. 2, a rotary power unit 9 (PGB, Power Gear Box) is connected to a turbine to drive the respective and opposite rotations of the propellers, the pivot pins or roots 10, 11 of the blades 5, 6 of which are mounted in rotary polygonal ring housings 12, 13 secured to respective cylindrical casings or shell rings 14 driven by the power gearbox 9 via concentric and counter rotating shafts 15, 16 and respective rolling bearings 17, 18. Incidentally, it will be noted from these figures that the pivot pins 10, 11 are, as recalled earlier, provided with counterweights 19 extending from the pivot pins 10 in a cranked fashion, transversally, to spontaneously return the blades 6 to the feathered position (with the least possible drag) in the event of any malfunctioning of the pitch change system that forms the subject of the invention and that will be described hereinafter.

Specifically, the angle of setting or the pitch of the blades of the upstream front propeller 3 and of the downstream rear propeller 4 of the pair of propellers is variable using respective blade pitch change or orientation systems 20 and 21 which are designed to optimize the various domains or phases of operation of the airplane.

In the rest of the description, reference will be made to the system 21 that orientates the pitch of the downstream propeller, it being understood that this system could be fitted to the upstream propeller or to the propellers of an "open rotor pusher".

With reference to FIG. 2, the orientation system 21 according to the invention comprises a linear-displacement fluidic actuator 22 and a rotary transmission device 23 connecting the translationally mobile part or body 24 of the actuator to the pivot pins 11 of the blades 6 which swivel in housings of the polygonal ring 13. In this FIG. 2, the transmission device 23 is partially symbolized by a rectangle representing a sliding rotary ring 25 and intermediate connecting mechanisms 26 that connect the ring to the pivot pins of the blades.

In particular, as FIG. 2 shows, the fluidic actuator 22 is an annular hydraulic ram centered on the axis A and having a fixed part 27 with piston 28 secured to a stator casing 29 of the turbomachine and, around the fixed part 27, the translationally sliding mobile part 24. Defined between the two parts 24-27 and the piston 28 are internal chambers 30 fed from the high-pressure oil network of the turbomachine via a controllable hydraulic-fluid feed device which has not been illustrated in the figures because it does not form part of the invention per se.

However, this feed device allows oil to be sent to and/or returned from the chambers of the ram driving the sliding, in one direction or the other, of the mobile part 24 on the fixed part 27 in order to control the variation in the pitch of the blades of the relevant propeller 4 using the transmission device 23 of the orientation system 21 and to do so in the three distinct domains of operation recalled hereinabove.

Around the mobile part or body 24 of the annular ram 22 is the transmission device 23 which, in this embodiment, uses two load transfer bearings 31 (FIG. 2), such as ball bearings, that allow the translational movement of the mobile part 24 of the ram to be transferred to the rotary transmission device.

To do that, the inner rings 32 of the rolling bearings 31 are mounted, in axial abutment, around the mobile part 24 of the ram, while the outer rings 33, likewise in axial abutment, are housed in an outer cylindrical securing piece or support 34, which support is rotary via its connection with the device 23. Thus, translational movement of the inner rings as a result of the sliding of the annular ram results, via the rolling elements 35, in that of the outer rings 33 which are driven in rotation by the transmission device 23 connected to the propeller 4.

Structurally, the rotary transmission device of the orientation system 21 comprises radial arms 36, the transmission ring 25 and the connecting mechanisms 26 that connect the ring and the pivots 11 of the blades that are to be controlled.

In the embodiment illustrated with reference to FIGS. 2, 3 and 4, the arms 36 are cylindrical and there are four of them, evenly spaced 90° apart around the cylinder 34 and arranged in one and the same radial plane perpendicular to the longitudinal axis A of the turbomachine. These arms 36, of which there could be a minimum number of two for reasons of symmetry, have the purpose of, via their own rotation, controlling the sliding of the rotary ring 25 and of the mechanisms 26 located in the nacelle 38 outside the rotary casings 14 housing the actuator, and therefore the rotation of the pivot pins of the blades 6 of the propeller 4, of which blades there are, in this example, twelve. Thus, a reduced number of radial arms is able to act on a multiple number of blades, thereby reducing the abovementioned problems of sealing relating to the various rotary casings 14 of the turbomachine through which casings the arms pass. These arms are able to "come out of" the casings to be connected to the common rotary ring which is likewise connected to the blades by the mechanisms and is thus radially offset from the axis A, to a diameter that more or less corresponds to that of the polygonal ring 13 that supports the blades (refer to the rectangle 25, 26 in FIG. 2).

Each cylindrical radial arm 36 is held and guided in its rotation, about its axis, in the rotary casings by rolling bearings 37. One of these is notably depicted in FIG. 2 and is situated on the inside of the relevant rotary casing 14 through which the radial arm passes via sealing elements that have not been illustrated. The other rolling bearing has not been illustrated and is situated on the outside of this rotary casing. For information, the rolling bearings are mounted, in the conventional way, in housings formed in the walls of the rotary casing and held in position by a shoulder on one side and by a retaining means of the elastic ring type on the other side.

It will also be noted that blade control is ultimately effected by the connecting mechanisms 26 ending the kinematic chain of the orientation system 21 and described hereinafter. These mechanisms are situated in the nacelle 38 of the turbomachine, with the ring 25 and, therefore, at a large radius remote from the axis A, by virtue of the radial arms 36 which extend from the ram, near the axis A, to the roots of the blades 6. Such an arrangement of the common ring 25 and of the mechanisms 26 which are housed in the nacelle 38 at a diameter approximately the same as the diameter of the polygonal ring 13 of the propeller, facing this ring 13 (FIG. 2) and thus offset from the ram, makes it possible to reduce the number of radial arms and also to pull or push, parallel to the axis A, with a lower force, against the cranked counterweights 19 of the pivot pins 11 in order to turn the blades.

To drive the rotation of the radial arms about their axes, the connections between the ends of each of the arms 36 and the cylindrical support 34, on the one hand, and the rotary transmission ring 25, on the other, are of a meshing rack-pinion type in this example. However, they could be mechanically different, such as link rods as will be seen schematically in FIG. 10.

Figure 3:
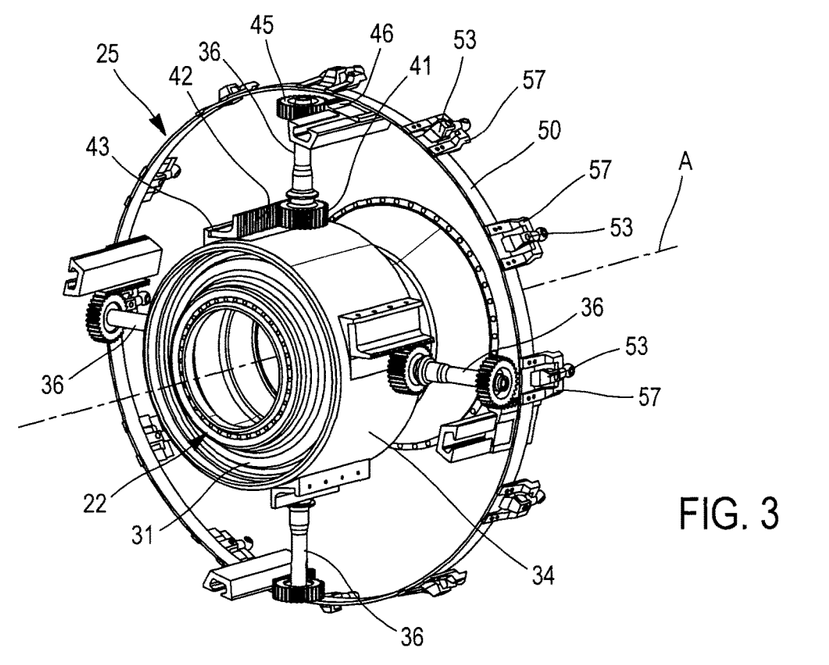
FIG. 3 is a partial perspective view notably showing radial arms of the pitch change system which connect the control actuator to the rotary ring that transmits the movement in the system.
Figure 4:
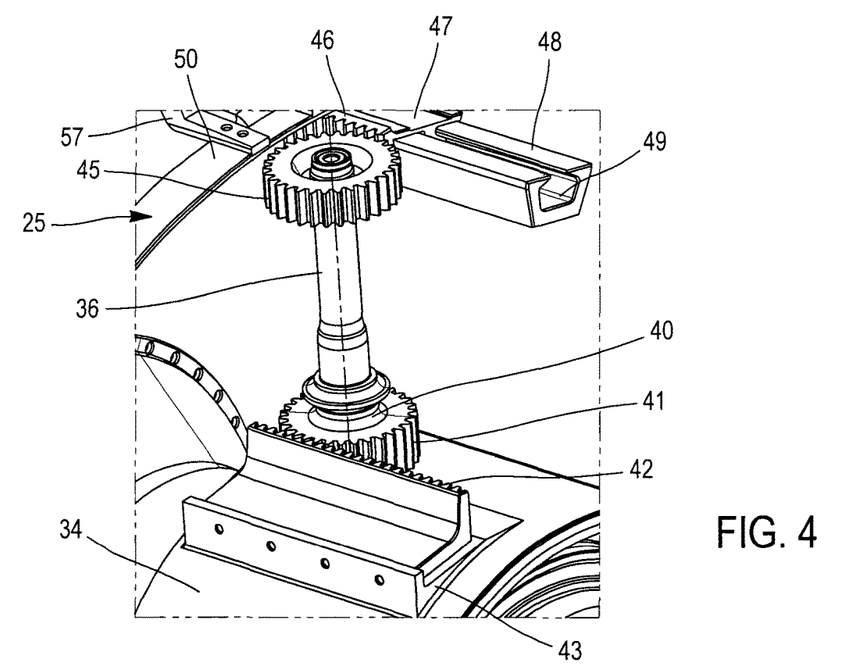
FIGS. 4 and 5 are enlarged perspective views showing the respective connections of a radial arm to a bearing support of the actuator and to the transmission ring of the system.

To this end, as FIGS. 3 and 4 show, the inside or inner end 40 (with respect to the axis A of the turbomachine) of each radial arm 36 is equipped with a pinion 41 collaborating with a rack 42 borne by a platform 43 secured to the cylindrical part 34. Each rack is arranged parallel to the axis A, along the translational movement of the mobile body 24 of the annular ram 22.

Figure 5:
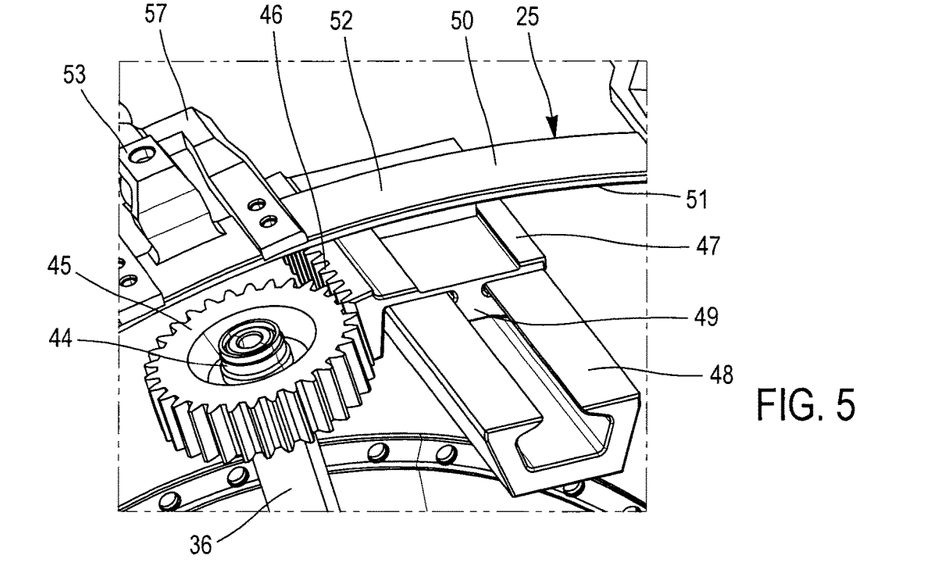

As far as the outside or upper end 44 of each radial arm is concerned, it may be seen, as FIGS. 4 and 5 show, that this side is equipped with a pinion 45 collaborating with a rack 46 formed on a platform 47 able to slide in a guideway 48 secured to the engine structure by shell rings that have not been depicted.

The platforms 47 of the racks are secured to the rotary ring common to the arms 36 and to the mechanisms 26 so that this ring, in addition to being able to rotate, becomes translationally mobile. It may moreover be seen that each rack platform 27 is slidably mounted in the corresponding guideway 48 via a connection 49 of the dovetail type, which ensures precision guidance and functional reliability.

The racks 46 are obviously parallel to the racks 42 on the inside of the radial arms 36, along the axis A. Further, the meshing rack-pinion connections are all identical to one another, simplifying the movement of the ring with respect to the ram and minimizing costs.

It will therefore be appreciated that the translational movement of the mobile body of the ram 22 causes that of the support 34 of the bearings and as, as a result, that of the racks 42 of the platforms 43, which drive the rotation of the arms 36 about their respective axes. That causes the pinions 45 to drive the translational movement of the racks 46 in the platforms 48 and that of the rotary transmission ring 25. The latter is largely illustrated with reference to FIGS. 3, 5, 6 and 7, and thus is intended to advance or retreat along the axis A according to the linear displacement of the ram, of the arms and meshing connections, and spread the pitch control force over all the blade pivots, via the connecting mechanisms 26.

The rotary transmission ring 25 has a wall 50 of flattened rectangular section. On the internal face 51 of this wall there are, evenly distributed and projecting from the front or upstream side of the ring with respect to the turbomachine, the four platforms 47 with racks 46 for the radial arms 36, which rack platforms are secured to the wall 50 by fastening elements that have not been depicted. By contrast, on the external face 52 and on the rear or downstream side with respect to the turbomachine are arranged the supports 53 of the connection mechanisms 26 that connect to the pivots of the blades of the propeller 4. There are therefore twelve of these supports, the same number as there are blades to be orientated, these being evenly spaced apart around the ring, with respect to the axis A. In one exemplary embodiment, these supports 53 are U-shaped yokes that accept connecting rods of the connecting mechanisms 26.

Figure 6:
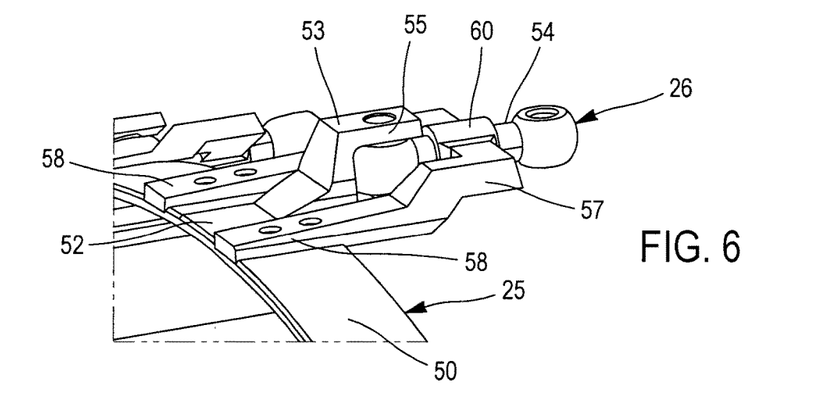
FIGS. 6 and 7 respectively are views in perspective and in section of the connection between the rotary transmission ring and one of the connecting mechanisms connecting to the relevant blade of the propeller.
Figure 7:
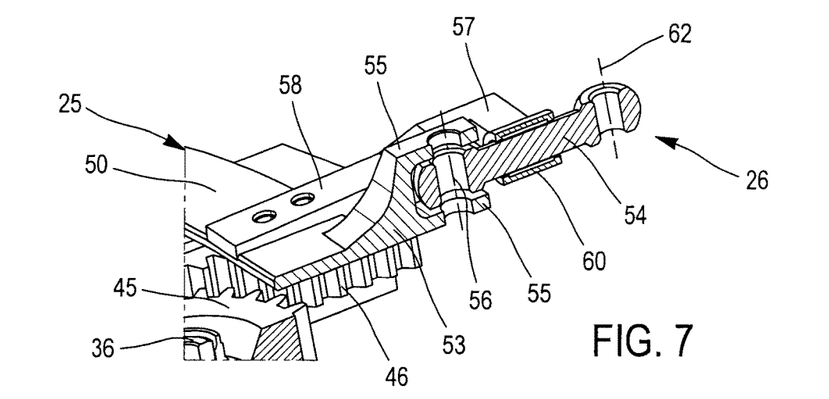

As can be seen notably from FIGS. 6 and 7, one end of a link rod 54 of one of the mechanisms depicted is shown between the parallel legs 55 of the yoke 53 and is articulated to this yoke by a pivot pin with a ball swivel 56 that is radial, perpendicular to the axis A.

Incidentally, it will be noted that mounted around the body of the link rod 54 of each mechanism is a support piece 57 which is fixed by lugs 58 to the external face 52 of the ring. The lugs 58 of each support piece 57 are respectively positioned one on each side of the yoke 53. Positioned between the support piece 57 and the body of the connecting rod 54 is a stiffening means 60 such as a highly stiff deformable cylindrical ring. The purpose of this ring 60 is to introduce degrees of freedom into each connecting and load-transmitting mechanism 26 of the device 23 so as to reduce the influence that the aerodynamic moments experienced by the blades have on the orientation system, as will be seen later on.

Figure 8:
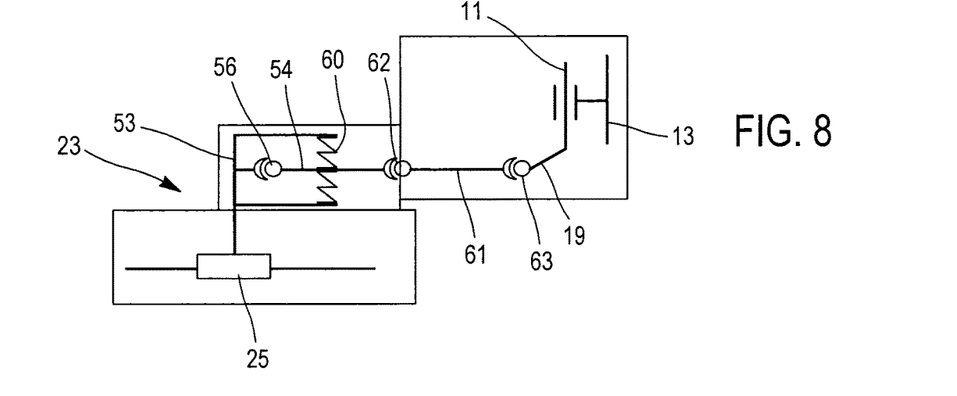
FIGS. 8 and 9 are schematic views showing the control of the blades of the propeller using the system equipped with a stiffening elastic means, respectively under the action of normal aerodynamic loadings and high aerodynamic loadings applied to the blades.

Initially, the link rod 54 of each connecting mechanism 26 is connected to another control link rod 61, itself connected to the crank counterweights 19 which terminate the pivot pin 11 of the relevant blade, as the schematic FIG. 8 shows. The two link rods 54, 61 are articulated to one another about a pivot pin 62 parallel to the previous one, and the free end of the other link rod 61 and the counterweight 19 are also joined together by a pivot pin 63. The two link rods of the mechanisms are more or less aligned, parallel to the sliding rotary ring (along the axis A).

The link rods 54, 61 and the associated counterweights 19 form link rod-crank assemblies which, through the sliding of the mobile body 24 of the ram, of the bearings 31, of the rotary cylindrical support 34 and of the rotary radial arms 36 with racks and pinions, convert the translational movement of the rotary common ring 25 into a rotational movement of the blades 6 by pulling or pushing on the counterweights in order to vary the pitch of the blades about the pivots 11 which rotate in the housings of the polygonal ring 13.

Furthermore, the connecting mechanisms 26 offer a small travel with high stiffness by virtue of the stiffening means 60.

In normal operation as depicted in FIG. 8, for a connecting mechanism 26 of the system 21 which is not subjected to a deflection of the pivot pin 11 of the blades 6 under the effect of the aerodynamic loading, the link rod 54 connected to the yoke 53 of the sliding ring 25 is parallel to the longitudinal axis A of the turbomachine. The ring of the stiffening means 60 does not act but, through its stiffness, guides and centers the link rod.

Figure 9:
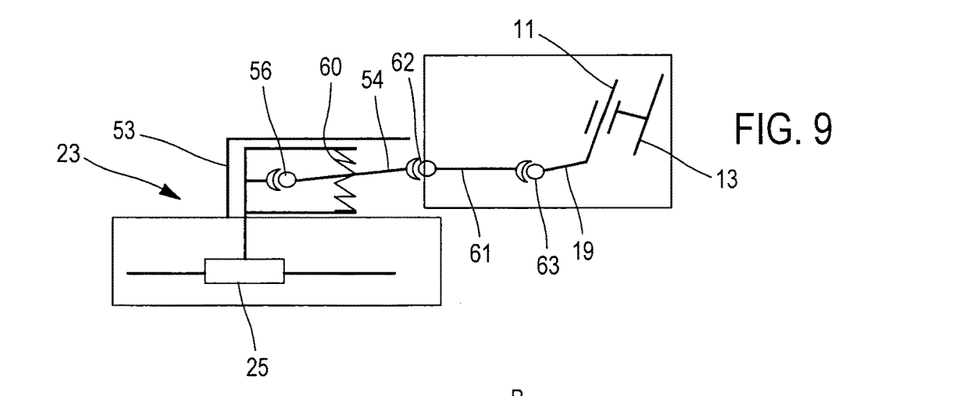

By contrast, if high magnitude aerodynamic loadings are applied to the blade causing the pivot pin 11 of the blade 6 to become inclined even slightly from its radial initial position, as shown in an exaggerated fashion in FIG. 9, for a given ram position (and therefore a given pitch), the depicted connecting mechanism 26 of the system, including the counterweight, is caused to deviate from its initial position.

Thanks to the articulated connecting mechanism 26 with small travel and high stiffness provided by the stiffening means, the various movements generated (of the pivot, counterweights, non-aligned link rods) are reacted by the high stiffness elastic ring 60 which will then deform, rather than these movements being transmitted to and reacted directly by the ring 25 of the transmission device 23 (connecting mechanisms and ring) with the risk of jamming. This additional degree of freedom offered by the stiffening means makes it possible to obviate this risk and make the orientation system as a whole more reliable.

While in the embodiment illustrated the stiffening means 60 takes the form of a high stiffness elastic ring (made of polymer or the like), it could adopt other configurations. For example, the stiffening means may be a radial spring mounted in a two-part cylindrical housing, one part acting as an outer ring mounted in the support piece and the other acting as an inner ring mounted on the connecting rod (ball seal type technology), or a flexible metal element with symmetry of revolution having a shape (for example a U shape) that allows it to act as a radial spring.

The blade counterweights 19 used by the orientation system 21 still remain active in the event of a malfunctioning of the hydraulic feed system, i.e. they allow the link rods to push on the ring of the transmission device. The ring 25, by sliding, applies a force to the rack platforms which thus, thanks to the reversibility of the rack 42, 46/pinion 41/45 connections with the radial arms 36, allow the system to be brought into a configuration in which the blades 6 are in the feathered position.

Figure 10:
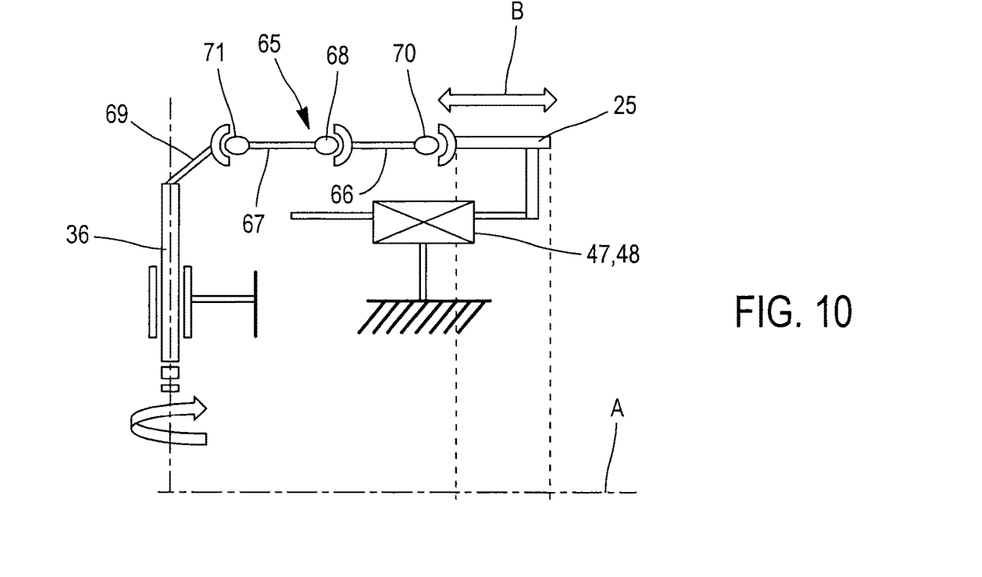
FIG. 10 is an alternative form of embodiment of the rotary transmission device of the pitch change system of the invention.

In an alternative form of embodiment depicted schematically in FIG. 10, the rack-pinion connections inside the nacelle 38, on the outside of the radial arms, are replaced by double connecting rod 65 connections.

The rotary ring 25 is still guided in translation by the platforms 47 in the guideways 48 fixed to the rotary casing of the nacelle, via the dovetail connections 49. The platform and guideway assembly has been symbolized by a rectangle in FIG. 10, while the translational movement of the ring 25 is indicated by a double-headed arrow B.

It may be seen that the two link rods 66, 67 are connected to one another by a common articulation 68, while the free ends of these link rods are connected, one of them to the ring 25 and the other to a crank 69 that terminates the radial arm 36, using suitable respective articulations 70, 71. The connecting mechanism 26 downstream of the ring has not been depicted. This alternative form works as a result of the rotation of the radial arms driving the double link rod connections which act on the rotary ring, moving it translationally in the dictated direction.

The orientation system 21 for controlling the pitch of the blades of a propeller makes it possible to reduce the number of radial arms 36 and the problems regarding sealing at the walls of the rotary casings through which the arms pass, through the arrangement of a sliding rotary ring 25, analogous to a driving annular guideway, controlled by the arms from the central ram and situated in the nacelle, near to the blade pivot pins, and by individual connecting mechanisms 26 providing the connection between the ring and the blades.

In addition, these mechanisms 26 of the orientation system in connection with the counterweights 19 allow these counterweights to be used as lever arms to control the pitch of the blades in addition to performing their main function, that of returning the blades to the feathered position in the event of any malfunctioning of the system or any hydraulic problem. The counterweights therefore have a dual function. Further, the introduction of a stiffening means that adds degrees of freedom makes it possible to reduce the risks of the common ring and the connecting mechanisms jamming if strong aerodynamic loadings are applied to the blades of the propeller.

What is claimed is:

1. A system for changing a pitch of blades of a propeller, comprising:
    a linear-displacement fluid actuator coaxial with the propeller; and
    a transmission device with radial arms connecting the actuator to the blades that are to be controlled,
    wherein the transmission device comprises a translationally movable rotary transmission ring which is connected, on a first side, to the radial arms, a rotation of which, imparted during movement of the actuator, drives said translational movement of the translationally movable rotary transmission ring and, on a second side, to pivot pins of the blades via intermediate connecting mechanisms that convert the translational movement of the translationally movable rotary transmission ring brought about by the actuator into a rotation of the blades of the propeller about the pivot pins, a stiffening means being provided between the rotary ring and each of the intermediate connecting mechanisms.

2. The system as claimed in claim 1, wherein the translationally movable rotary transmission ring has a diameter substantially the same as at a diameter of a support ring that supports the pivot pins of the blades, so as to lie at substantially a same radial position as the pivot pins of the blades.

3. The system as claimed in claim 1, wherein a number of radial arms is less than a number of blades with a minimum number of radial arms of at least two arms arranged symmetrically with respect to the actuator and connected, on an inside of the radial arms, to a translationally mobile part of the actuator and, on an outside of the radial arms, to said translationally movable rotary transmission ring.

4. The system as claimed in claim 1, wherein, mounted around a translationally mobile part of the actuator are bearings connected to the translationally mobile part of the actuator and housed in a rotary cylindrical support with which the radial arms of the transmission device collaborate.

5. The system as claimed in claim 4, wherein the rotary cylindrical support comprises first axial platforms with first racks, first pinions being secured to first ends of the radial arms and collaborating with the first racks, said first platforms, being able to drive the rotation of said radial arms as a result of the translational movement of the translationally mobile part of the actuator and of the support.

6. The system as claimed in claim 1, wherein the translationally movable rotary transmission ring comprises second axial platforms with second racks, second pinions being secured to second ends of the radial arms and collaborating with second racks, said second platforms being slidably mounted in guideways that are translationally fixed, so that the second pinions of the radial arms, by rotating, drive a translational movement of the second platforms and of the translationally movable rotary transmission ring with respect to the guideways.

7. The system as claimed in claim 1, wherein the transmission device comprises four radial arms arranged so as to be uniformly spaced 90° apart about said linear actuator.

8. The system as claimed in claim 1, wherein each intermediate connecting mechanism of the transmission device comprises first and second link rods which are articulated to one another, the first link rod also being articulated to a fastening support for securing the translationally movable rotary transmission ring and the second link rod also being articulated to the pivot pin of a corresponding blade of the propeller, the first and second link rods of each intermediate connecting mechanism being substantially aligned parallel to an axis of rotation of the translationally movable rotary transmission ring and perpendicular to an axis of pivoting of the corresponding blade, and the stiffening means of each intermediate connecting mechanism being provided between the fastening support for securing the translationally movable rotary transmission ring and the first link rod, whereas the second, link rod of the intermediate connecting mechanism is articulated to a counterweight secured to the pivot pin of the corresponding blade.

9. The system as claimed in claim 8, wherein the stiffening means is a ring of elastic material surrounding the first link rod, a radial spring, or an element made of metal positioned between the support and the first link rod.

10. A turbomachine having at least one propeller for an aircraft, comprising a system for changing a pitch of blades of said propeller, said blades being controlled, comprising a linear displacement annular fluidic actuator and a transmission device with radial arms connecting the actuator to the blades being controlled in order to change an orientation of the blades,
    wherein the transmission device is of the type as defined in claim 1.

* * * * *

UNITED STATES PATENT AND TRADEMARK OFFICE
CERTIFICATE OF CORRECTION

PATENT NO. : 9,884,675 B2  
APPLICATION NO. : 14/154411  
DATED : February 6, 2018  
INVENTOR(S) : Augustin Curlier et al.

Page 1 of 1

It is certified that error appears in the above-identified patent and that said Letters Patent is hereby corrected as shown below:

In the Claims

Column 10, Lines 4-5, change "first platforms, being" to --first platforms being--; and Column 10, Line 35, change "the second, link" to --the second link--.

Signed and Sealed this  
Sixth Day of August, 2019

Andrei Iancu  
*Director of the United States Patent and Trademark Office*